(12) United States Patent
O'Neil et al.

(10) Patent No.: US 10,890,227 B2
(45) Date of Patent: Jan. 12, 2021

(54) WEAR LINER WITH UNIDIRECTIONAL NOTCH

(71) Applicant: GOODRICH CORPORATION, Charlotte, NC (US)

(72) Inventors: Matthew R O'Neil, Tipp City, OH (US); Ramesh B Kurup, Centerville, OH (US)

(73) Assignee: Goodrich Corporation, Charlotte, NC (US)

(*) Notice: Subject to any disclaimer, the term of this patent is extended or adjusted under 35 U.S.C. 154(b) by 142 days.

(21) Appl. No.: 16/359,768

(22) Filed: Mar. 20, 2019

(65) Prior Publication Data

US 2020/0300324 A1   Sep. 24, 2020

(51) Int. Cl.
  *F16D 69/04* (2006.01)
  *F16D 65/12* (2006.01)
  (Continued)

(52) U.S. Cl.
  CPC .......... *F16D 69/0408* (2013.01); *B64C 25/42* (2013.01); *F16D 55/36* (2013.01); *F16D 65/122* (2013.01); *F16D 69/00* (2013.01); *F16D 69/023* (2013.01); *F16D 69/04* (2013.01); *F16D 65/126* (2013.01); *F16D 2065/1324* (2013.01); *F16D 2069/001* (2013.01); *F16D 2069/009* (2013.01); *F16D 2069/0441* (2013.01); *F16D 2200/0021* (2013.01); *F16D 2200/0039* (2013.01); *F16D 2200/0052* (2013.01)

(58) Field of Classification Search
  CPC .... F16D 69/0408; F16D 69/00; F16D 65/122; F16D 55/36; F16D 69/04; F16D 2065/1324; F16D 69/023; F16D 2200/052; F16D 2200/0021; F16D 2200/0039; F16D 65/126; F16D 2069/0441; F16D 2069/001; F16D 2069/009; B64C 25/42
  USPC ..... 188/71.5, 218 XL, 73.2, 18 A, 234, 238, 188/242, 243, 250 B–250 D, 250 G, 188/250 R; 244/110 A
  See application file for complete search history.

(56) References Cited

U.S. PATENT DOCUMENTS 5,779,006 A   7/1998   Hyde et al.
7,090,057 B2  8/2006   Fryska et al.
(Continued)

FOREIGN PATENT DOCUMENTS

EP   3428470       1/2019
FR   2326623  A  *  4/1977

OTHER PUBLICATIONS

European Patent Office, European Search Report dated Jul. 2, 2020 in Application No. 19215806.1.

*Primary Examiner* — Pamela Rodriguez
(74) *Attorney, Agent, or Firm* — Snell & Wilmer L.L.P.

(57) ABSTRACT

A friction disk of a braking system may include a friction disk core and a first wear liner. The friction disk core has an outer surface that defines a recess extending gradually inward from the outer surface, according to various embodiments. The wear liner mates to the outer surface of the friction disk core and includes a wear surface and a first non-wear surface, according to various embodiments. The first wear liner further includes a notch extending gradually outward from the first non-wear surface of the wear liner, according to various embodiments. In an installed state, the notch is received within the recess, according to various embodiments.

11 Claims, 7 Drawing Sheets

(51) Int. Cl.
  *F16D 55/36* (2006.01)
  *B64C 25/42* (2006.01)
  *F16D 69/02* (2006.01)
  *F16D 69/00* (2006.01)
  *F16D 65/02* (2006.01)

(56) References Cited

U.S. PATENT DOCUMENTS

| | | |
|---|---|---|
| 7,168,528 B1 | 1/2007 | Bok et al. |
| 9,360,063 B2 | 6/2016 | Chambard et al. |
| 9,695,891 B2 | 7/2017 | Kirkpatrick |
| 10,094,439 B2 | 10/2018 | Charles et al. |
| 2018/0149216 A1 | 5/2018 | Kirkpatrick |
| 2018/0252284 A1 | 9/2018 | Charles |
| 2020/0292019 A1* | 9/2020 | O'Neil .................. F16D 69/02 |
| 2020/0300317 A1* | 9/2020 | O'Neil .................. F16D 55/36 |

* cited by examiner

SECT A-A

WEAR LINER WITH UNIDIRECTIONAL NOTCH

FIELD

The present disclosure relates to braking systems, and more specifically to wear liners for friction disks of aircraft breaking systems.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. Current disk assemblies may comprise replaceable wear liners coupled to a reusable core. The liner may be attached to the core via a flange disposed at either an outer diameter of the liner for rotor assemblies or an inner diameter of the liner for stator assemblies. Attaching the liners via a flange can present torque transfer problems, particularly, when the liner is in a worn state.

SUMMARY

A wear liner for use in a friction disk is disclosed herein. The wear liner may comprise an annular structure and a plurality of notches. The annular structure may have a wear surface and a non-wear surface. The plurality of notches may be disposed on the non-wear surface. Each notch may extend away from the non-wear surface.

In various embodiments, each notch in the plurality of notches may further comprise an incline and a peak. The incline may extend gradually away from the non-wear surface. The peak may intersect the incline and extend perpendicularly to the non-wear surface. Each notch in the plurality of notches may be configured to mate with a respective recess of a friction disk core. Each notch in the plurality of notches may be spaced equally about the annular structure.

A friction disk is disclosed herein. The friction disk may comprise friction disk core and a wear liner. The friction disk core may comprise a core outer surface and a recess disposed on the core outer surface. The wear liner may comprise an annular structure and a notch. The annular structure may have a wear surface and a non-wear surface. The notch may be disposed on the non-wear surface. The notch may have a complimentary shape to the recess, wherein the notch is configured to mate with the recess.

In various embodiments, the notch may further comprise an incline and a peak. The recess may comprise a decline and a step. The peak may contact the step during operation. The peak may be configured to transfer torque from the wear liner to the friction disk core. The friction disk core may comprise a rotor core. The friction disk core may comprise a stator core. The wear surface may be planar and continuous.

A multi-disk brake system is disclosed herein. The multi-disk brake system may comprise a first friction disk and a second friction disk. The first friction disk may comprise a first friction disk core and a first wear liner. The first friction disk core may comprise a first core outer surface and a first plurality of recesses disposed on the first core outer surface. The first wear liner may comprise a first annular structure and a first plurality of notches. The first annular structure may have a first wear surface and a first non-wear surface. The first plurality of notches may be disposed on the first wear surface. Each notch in the first plurality of notches may have a first complimentary shape to each respective recess in the first plurality of recesses. Each notch in the first plurality of notches may be configured to mate with each respective recess in the first plurality of recesses. The second friction disk core may comprise a second friction disk core and a second wear liner. The second friction disk core may comprise a second core outer surface and a second plurality of recesses disposed on the second core outer surface. The second wear liner may comprise a second annular structure and a second plurality of notches. The second annular structure may have a second wear surface and a second non-wear surface. The second plurality of notches may be disposed on the second wear surface. Each notch in the second plurality of notches may have a second complimentary shape to each respective recess in the second plurality of recesses. Each notch in the second plurality of notches may be configured to mate with each respective recess in the second plurality of recesses.

In various embodiments, each notch from the first plurality of notches and the second plurality of notches may further comprise an incline and a peak. Each recess from the first plurality of recesses and the second plurality of recesses comprises a decline and a step. Each peak in the first plurality of notches may contact a respective step from the first plurality of recesses during operation and may be configured to transfer torque from the first wear liner to the first friction disk core. The first friction disk may comprise a rotor core. The second friction disk may comprise a stator core. The first wear liner may be a first loose component in the multi-brake system. The second wear liner may be a second loose component in the multi-brake system. The first wear surface is planar and continuous, and wherein the second wear surface is planar and continuous.

Figure 1:
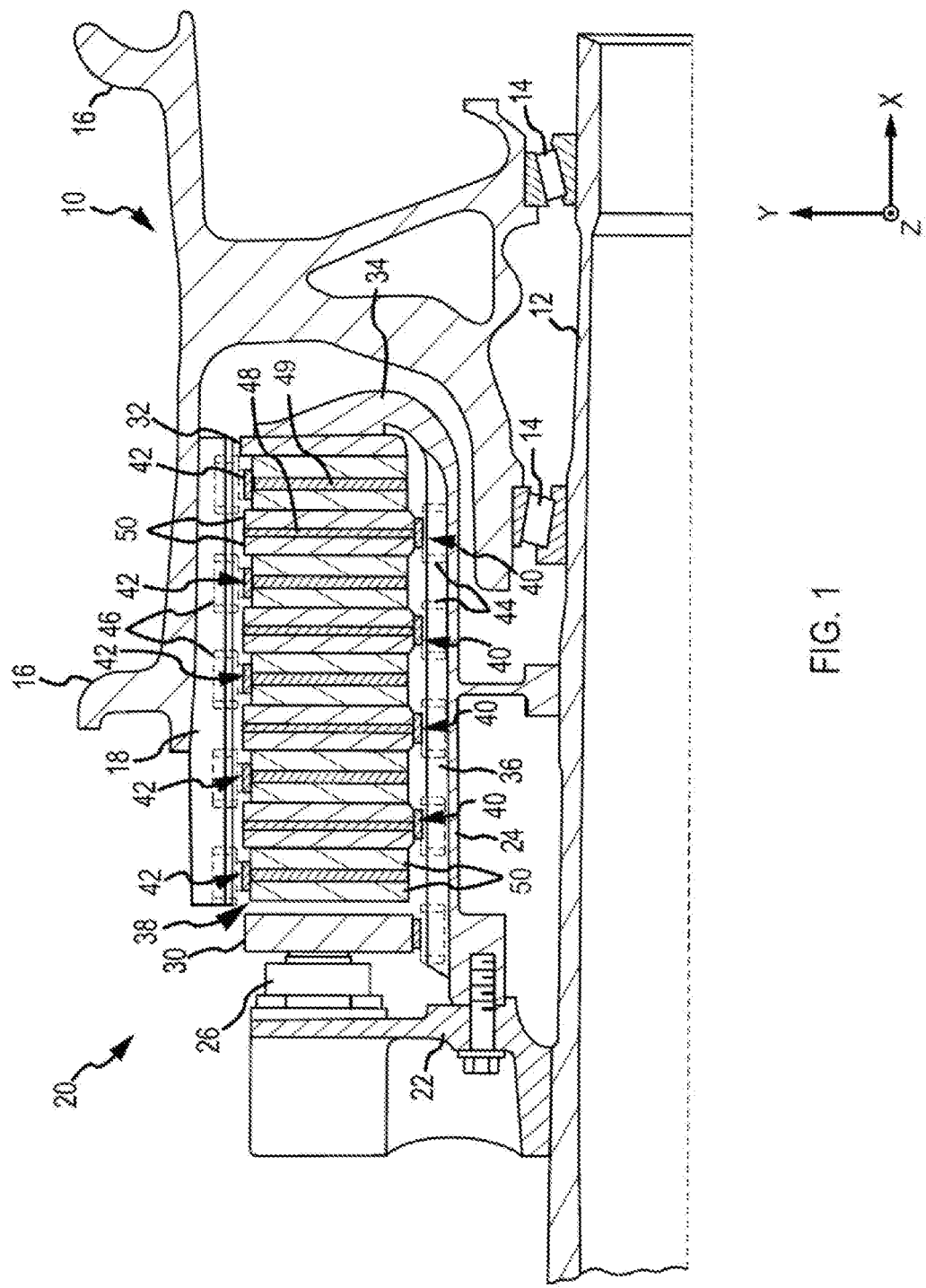
FIG. 1 illustrates a cross-sectional view of a multi-disk brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, are wear liners for friction disks (e.g., rotors and stators) of a braking system. The friction disks may include a friction disk core with wear liners coupled to the friction disk core. As described in greater detail below, the wear liner may include a plurality of notches that protrude from a non-wear surface of the wear liner. The wear liners may be loosely coupled to the friction disk core and may be positioned to provide frictional contact with adjacent friction disks during braking. The wear liners may be used for rotor and stator friction disks. In other words, the wear liners may be compatible with both rotor cores and stators cores. The interchangeability of the wear liners may simplify the friction disk manufacturing process and/or increase output by reducing assembly time. In various embodiments, the elimination of fasteners, rivets, and other components previously used to mechanically couple friction disks to wear liners reduces components and decreases cost of the assembly. Additionally, in various embodiments, the integrated notches may allow a greater portion of the wear liner to be utilized thereby reducing material waste.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2A:
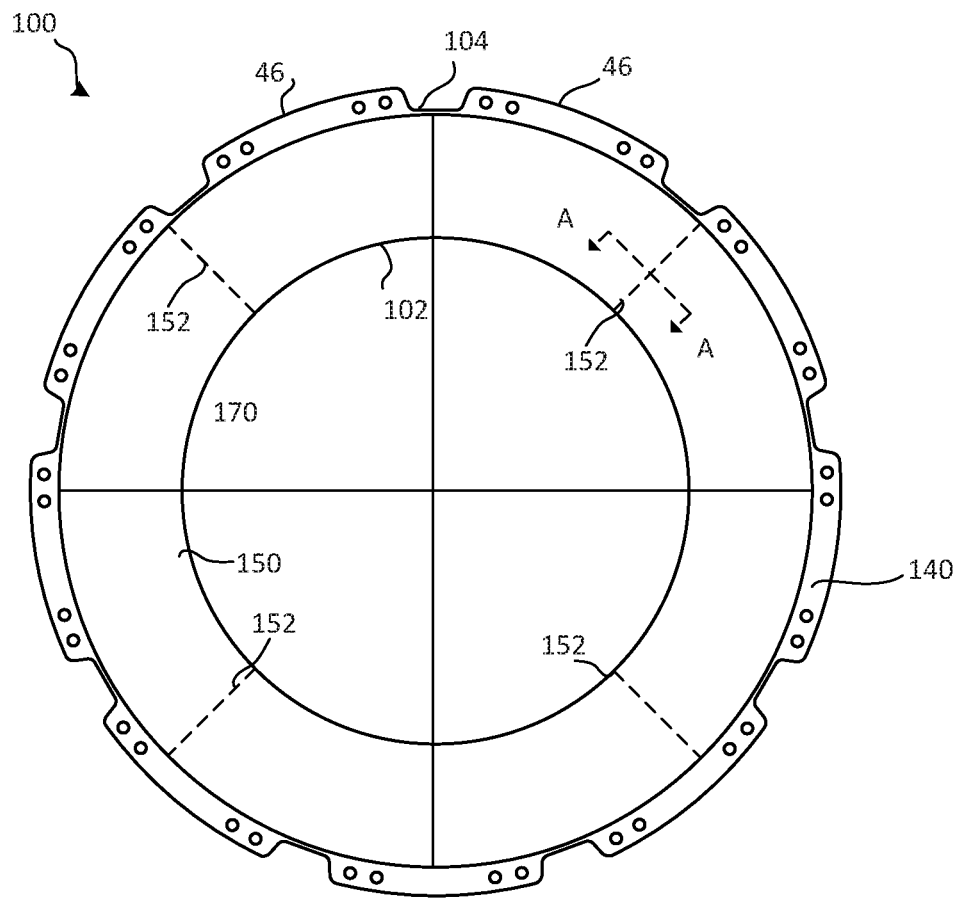
FIG. 2A illustrates a front view of a friction disk having wear liners disposed on an outer surface of the friction disk core, according to various embodiments.

FIG. 2A illustrates a front view of a friction disk 100 having wear liners 150 disposed on a front surface of a friction disk core 140, according to various embodiments. Friction disk 100 may be a stator or a rotor, such as stator 48 or rotor 49 described above with reference to FIG. 1. In various embodiments, wear liner 150 may be replaceable, such that after wear liners 150 have been worn below a suitable operational thickness, wear liner 150 may be removed from friction disk core 140 and replaced by new or remanufactured wear liners.

In various embodiments, friction disk core 140 and wear liners 150 may comprise different materials. For example, in various embodiments, friction disk core 140 may comprise a first material (e.g., ceramics or steel) and wear liners 150 may comprise a second material such as a carbon composite material. In various embodiments, friction disk core 140 and wear liners 150 may comprise the same material, such as a carbon composite material. In various embodiments, the material of friction disk core 140 may be selected for its structural properties, thermal conductivity, heat capacity, and/or oxidation resistance properties. For example, friction disk core 140 may comprise silicon carbide, tungsten carbide, or titanium. In various embodiments, a material of wear liners 150 may be selected for its wear resistance and/or frictional properties. Thus, friction disk 100 may contain the structural advantages of friction disk core 140 and the frictional advantages of wear liners 150. In various embodiments, friction disk core 140 may be made of ceramics, and wear liner may be made of carbon, reducing oxidation impact to the friction disk.

Friction disk core 140 may comprise a rotor spine and rotor lugs 46. Friction disk core 140 may engage rotor splines 18 (FIG. 1) in rotor gaps formed between rotor lugs 46. Thus, friction disk 100 may be rotatable by virtue of the engagement between rotor lugs 46 of friction disk core 140 and rotor splines 18 of wheel 10 (FIG. 1). Friction disk core 140 may comprise an inner circumferential surface 102 and an outer circumferential surface 104 radially outward of inner circumferential surface 102. Rotor lugs 46 may be extend from outer circumferential surface 104.

Figure 2B:
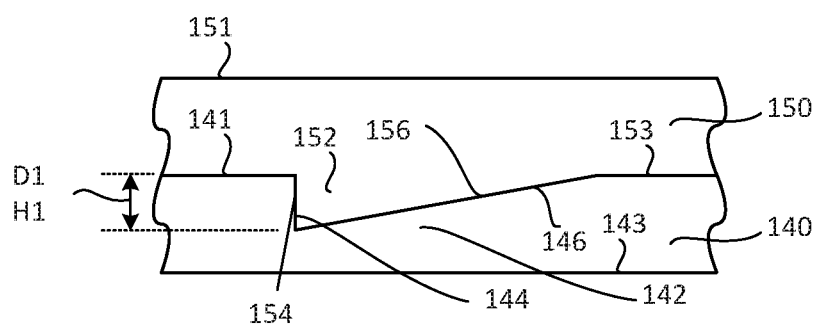
FIG. 2B illustrates a partial cross-sectional view of a friction disk having wear liners disposed on an outer surface of the friction disk core, according to various embodiments.

In various embodiments, wear liner 150 may comprise a plurality of notches 152. Notches 152 are shown as hidden lines in FIG. 2A because they are not visible from a front view of friction disk 100. Wear liner 150 may comprise an annular structure. In various embodiments, the plurality of notches 152 may be spaced circumferentially equally apart about the annular structure of the wear liner 150. With reference now to FIG. 2B, a sectional view of the friction disk 100 along section line A-A is illustrated. Wear liner 150 may comprise a wear surface 151 and a non-wear surface 153. Each notch 152 may comprise an incline 156 and a peak 154. The incline 156 may start at the non-wear surface 153 and gradually extend away from non-wear surface 153 of wear liner 150. Upon reaching a notch height, the incline 156 of the notch 152 may transition to peak 154 and extend perpendicular to the non-wear surface 153 and wear surface 151 of the wear liner 150 in a direction toward the wear surface 151 and intersect the wear liner non-wear surface 153.

In various embodiments, the incline 156 may be between 2 degrees and 30 degrees above the non-wear surface 153. In various embodiments, the incline 156 may be between 5 degrees and 20 degrees above the non-wear surface 153. In various embodiments, the incline 156 may be between 5 degrees and 15 degrees above the non-wear surface 153. In various embodiments, the incline 156 may be curved. In various embodiments, the incline 156 may be either convex or concave.

Similar to the plurality of notches 152 of the wear liner 150, the friction disk core 140 may have complimentary recesses 142 that interface with notches 152. For example, friction disk core 140 may comprise a core outer surface 141 and a core inner surface 143. Core outer surface 141 may interface with wear liner non-wear surface 153. In various embodiments, recess 142 may comprise a decline 146 that may start at core outer surface 141 and extend gradually toward core inner surface 143 of friction disk core 140. Upon reaching a recess depth, the decline 146 of the recess 142 may transition to step 144. Step 144 may have a depth substantially equal to the height of peak 154. Similarly, decline 146 may have a substantially equal slope as incline 156. Thus, notches 152 and recesses 142 may be substantially complimentary. The interface between each notch 152 and each recess 142 may prevent the wear liner 150 and the friction disk core 140 from rotating independently of each other.

In various embodiments, the decline 146 may be between 2 degrees and 30 degrees below the core outer surface 141. In various embodiments, the decline 146 may be between 5 degrees and 20 degrees below the core outer surface 141. In various embodiments, the decline 141 may be between 5 degrees and 15 degrees below the core outer surface 141. In various embodiments, the decline 146 may be curved. In various embodiments, the incline 146 may be either convex or concave. In various embodiments, the incline 146 may be complimentary in shape to the decline 156. In various embodiments, the step 144 may be substantially perpendicular to core outer surface 141. Substantially perpendicular may be plus or minus 15 degrees.

In various embodiments, the friction disk core 140 may have an inner surface that mirrors its outer surface. Thus, a wear liner 150 may be disposed on an inner surface of a friction disk and on an outer surface of a friction disk.

In various embodiments, wear liner 150 may not be mechanically connected to friction disk core 140. In various embodiments, wear liner 150 may be a loose component. By being a loose component, there is an added benefit that wear liner 150 may be replaced easily and installed easily. Additionally, without fasteners or rivets needed to connect the wear liner 150 to the friction disk core 140, the entire wear surface 151 may be a continuous friction surface without interruption. Additionally, a continuous friction surface provides a more uniform wear rate across the entire wear surface 151. Wear liner may be held in place by the notches 152 interfacing with the recesses 142 of the friction disk core 140, and the interfacing component of the wear surface 151. The interface between the notches 152 of the wear liner 150 and the recesses 142 of the friction disk core 140 allows for torque to be transferred between the wear liner 150 and friction disk core 140 during braking operation without the use of rivets or other metallic components.

Figure 3A:
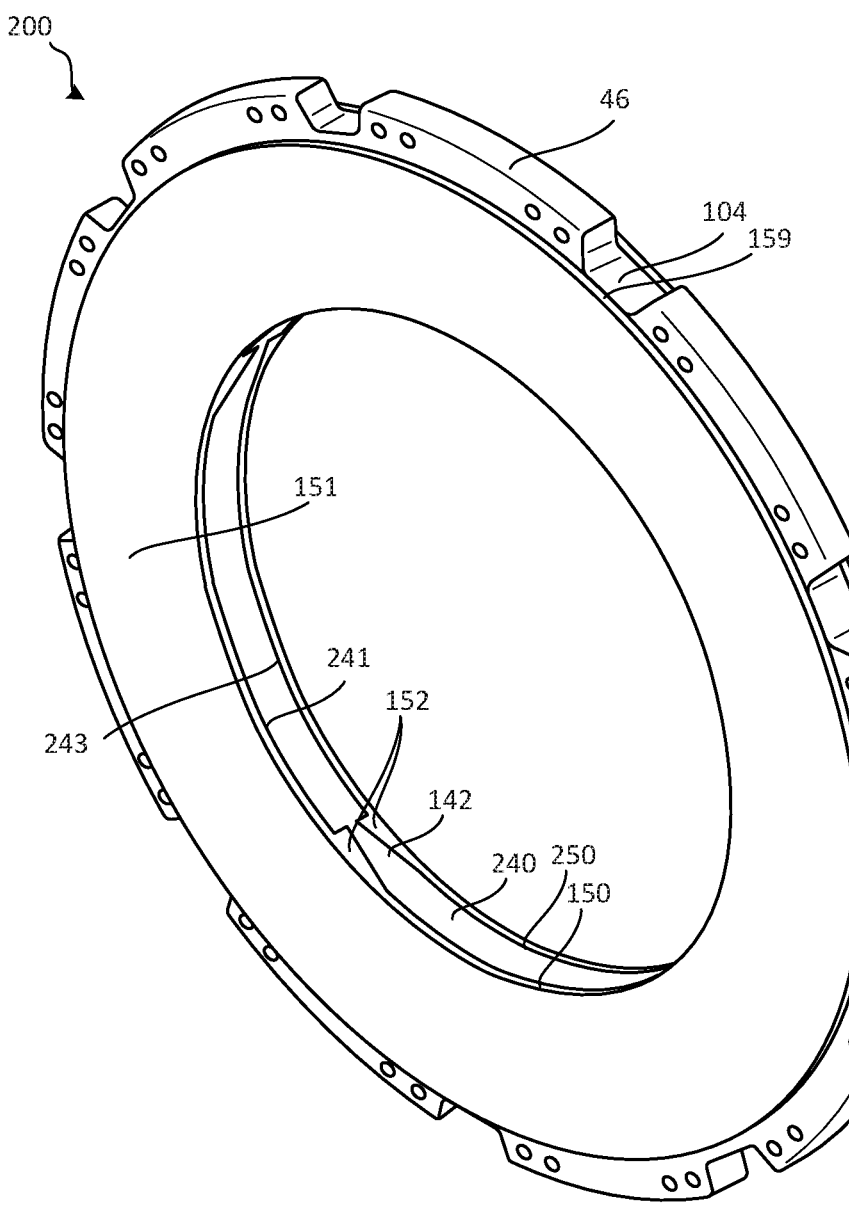
FIG. 3A illustrates a perspective view of a friction disk having wear liners disposed on opposing surfaces of the friction disk core, according to various embodiments.

Referring now to FIG. 3A, a perspective view of a friction disk 200 having wear liners (150,250) disposed on opposing surfaces of the friction disk core 240, according to various embodiments. In various embodiments, friction disk core 240 may have a first side 241 and a second side 243 opposite the first side 241. The first side 241 may interface with a first wear liner 150, and the second side may interface with a second wear liner 250. The second wear liner 250 may mirror the first wear liner 150.

Figure 3B:
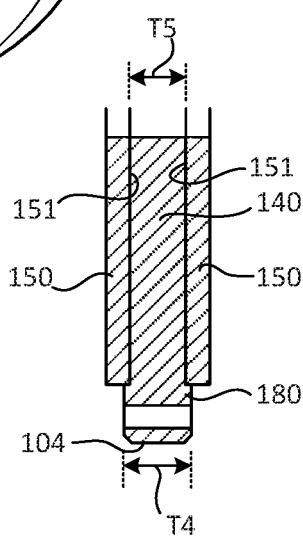
FIG. 3B illustrates a partial cross-sectional view of a friction disk having wear liners disposed on opposing surfaces of the friction disk core, according to various embodiments.

In various embodiments, and with reference to FIG. 3B, Friction disk core 140 may comprise a thickness T5 along the contact area with wear surface 151 of wear liners 150. Friction disk core 140 may comprise a thickness T4 at outer circumferential surface 104 and rotor lugs 46. In various embodiments, thickness T4 may be greater than thickness T5. Stated another way, a portion 180 of friction disk core 140 that is radially outward of wear liners 150 and proximate to outer circumferential surface 104 and rotor lugs 46 may comprise a thickness T4 that is greater than the thickness T5 of a radially inward portion of friction disk core 140 that is in contact with wear liners 150. In various embodiments, thickness T5 of friction disk core 140 may be between 0.30 inches and 1.0 inches (i.e., between 0.76 cm and 2.54 cm). In various embodiments, thickness T5 of friction disk core 140 may be between 0.40 inches and 0.75 inches (i.e., between 1.02 cm and 1.91 cm). In various embodiments, thickness T5 of friction disk core 140 may be between 0.50 inches and 0.60 inches (i.e., between 1.27 cm and 1.52 cm).

Figure 4:
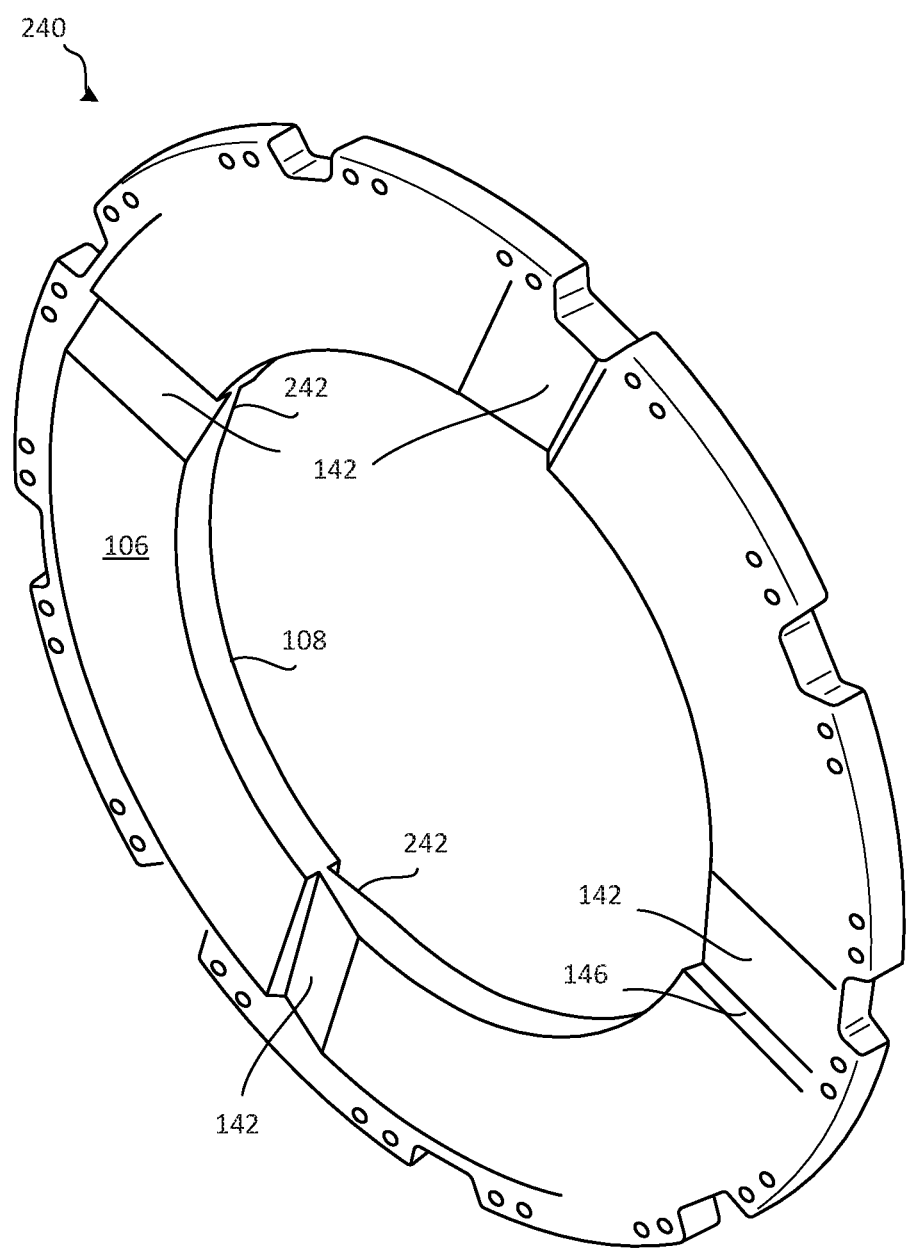
FIG. 4 illustrates a perspective view of a friction disk core define a plurality of recesses for receiving a corresponding plurality of notches of a wear liner, according to various embodiments.

FIG. 4 illustrates a perspective view of friction disk core 240 having a plurality of recesses 142 for receiving a corresponding plurality of notches 152 (FIG. 5) of wear liner 150, according to various embodiments. That is, a plurality of recesses 142 may be formed in, and defined by, first surface 106 of the friction disk core 240. A plurality of second recesses 242 may be formed in, and defined by, second surface 108 of the friction disk core 240. In various embodiments, the recesses 142, 242 have two legs, a gradual decline and a substantially perpendicular leg, and the recesses 142, 242 may be configured to face/engage the non-wear surface of the wear liners. In various embodiments, the recesses 142, 242 are circumferentially distributed and are configured to be aligned with corresponding/complementary notches 152 of the wear liners 150. This engagement between notches 152 and recesses 142 may facilitate torque transfer between the friction disk core 240 and the wear liners 150.

Each recess 142, 242 may be formed partially through friction disk core 240 such that a portion of friction disk core 240 remains between a bottom, or axially inward, surface of the recesses 142, 242. Stated differently, a depth of first recesses 142 and a depth of second recesses 242 may be selected such that a portion of friction disk core 240 remains between axially aligned first recesses 142 and second recesses 242. In various embodiments, the circumferential positions of the first recesses 142 are aligned with the circumferential positions of the second recesses 242. In various embodiments, the depth of the first recesses 142 may be about equal to the depth of second recesses 242. Referring back to FIG. 2B, in various embodiments, the depth D1 of recess 142 may be between 0.02 inches and 0.2 inches (i.e., between 0.51 mm and 5.1 mm). In various embodiments, the depth D1 of recess 142 may be between 0.05 inches and 0.15 inches (i.e., between 1.27 mm and 3.8 mm).

Figure 5:
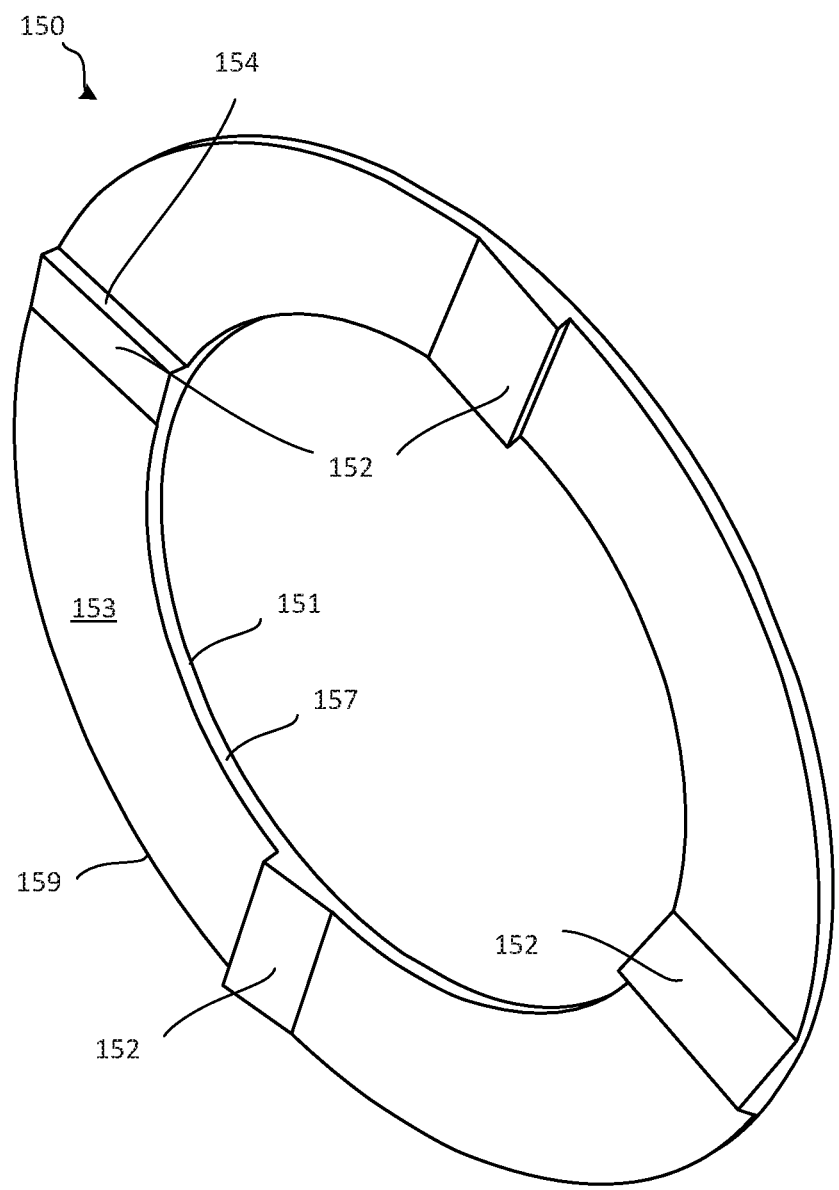
FIG. 5 illustrates a perspective view of a wear liner showing a non-wear surface of the wear liner having a plurality of notches, according to various embodiments.

In various embodiments, and with reference to FIG. 5, the notches 152 of wear liners 150 are shown. The wear liners 150 may comprise an inner circumferential surface 157 and an outer circumferential surface 159 radially outward of inner circumferential surface 157. Wear liners 150 may further include a wear surface 151 (FIG. 3A) and a non-wear surface 153 (FIG. 5) opposite wear surface 151. Wear surface 151 may be substantially planar, or flat, and may extend from inner circumferential surface 157 to outer circumferential surface 159. Wear surface 151 may be continuous from inner circumferential surface 157 to outer circumferential surface 159. Non-wear surface 153 may extend from inner circumferential surface 157 to outer circumferential surface 159 and may be oriented toward friction disk core 240.

Non-wear surface 153 may include a plurality of notches 152. Notches 152 may extend (i.e., protrude) from non-wear surface 153 in an axial direction toward friction disk core 240. Notches 152 may be integrally formed as part of the wear liner 150. The notches 152 may extend generally radially, and thus a peak 154 of the 152 may extend along or be parallel with radii of the wear liner. That is, a circumferential dimension of the notches 152 may taper or converge along a radially inward direction (e.g., from the outer circumferential surface 157 to the inner circumferential surface 159). Further, peaks 156 of notches 152 may complement the steps 146 of recesses 142 in terms of their orientation/shape. The notches 152 may be circumferentially distributed around the wear liner 150. In various embodiments, the number, size, and distribution of notches 152 may be selected according to the specifics of a given implementation in order to improve torque transfer and/or minimize vibrations. Further, the notches 152 may impart additional structural integrity/rigidity to the wear liners, thus reinforcing and otherwise providing mechanical stiffness to the wear liners 150. Referring back to FIG. 2B, in various embodiments, the height H1 of notch 152 may be between 0.02 inches and 0.2 inches. In various embodiments, the height H1 of notch 152 may be between 0.05 inches and 0.15 inches (i.e., between 1.27 mm and 3.8 mm).

In various embodiments, and with reference to FIGS. 3A and 3B, an assembled friction disk 200, including wear liners 150, 250 frictionally coupled to friction disk core 240. Wear surface 151 of wear liners 150 may be oriented away from friction disk core 240. Outer circumferential surface 159 of wear liners 150 may disposed radially inward from outer circumferential surface 104 and rotor lugs 46 of friction disk core 240. In various embodiments, outer circumferential surface 159 may be disposed at outer circumferential surface 104.

In various embodiments, each wear liner 150 may have an identical or substantially similar configuration. In various embodiments, each opposing wear liner 250 may have a mirrored shape to wear liners 150. In various embodiments, while friction disk core 240 is shown and described as a rotor, a similar/corresponding configuration of wear liners 150, 250 may be implemented for a stator. In such embodiments, wear liners 150, 250 may be interchangeable between rotors and stators (e.g. rotor 49 and stator 48 of FIG. 1) because the coupling of the wear liners is independent of rotor lugs 46 and stator lugs. Accordingly, the wear liners 150, 250 may be compatible with both rotors and stators, and thus the manufacturing process and inventory system for friction disks may be simplified, thus resulting in potentially higher manufacturing output and/or reduced assembly time.

Figure 6:
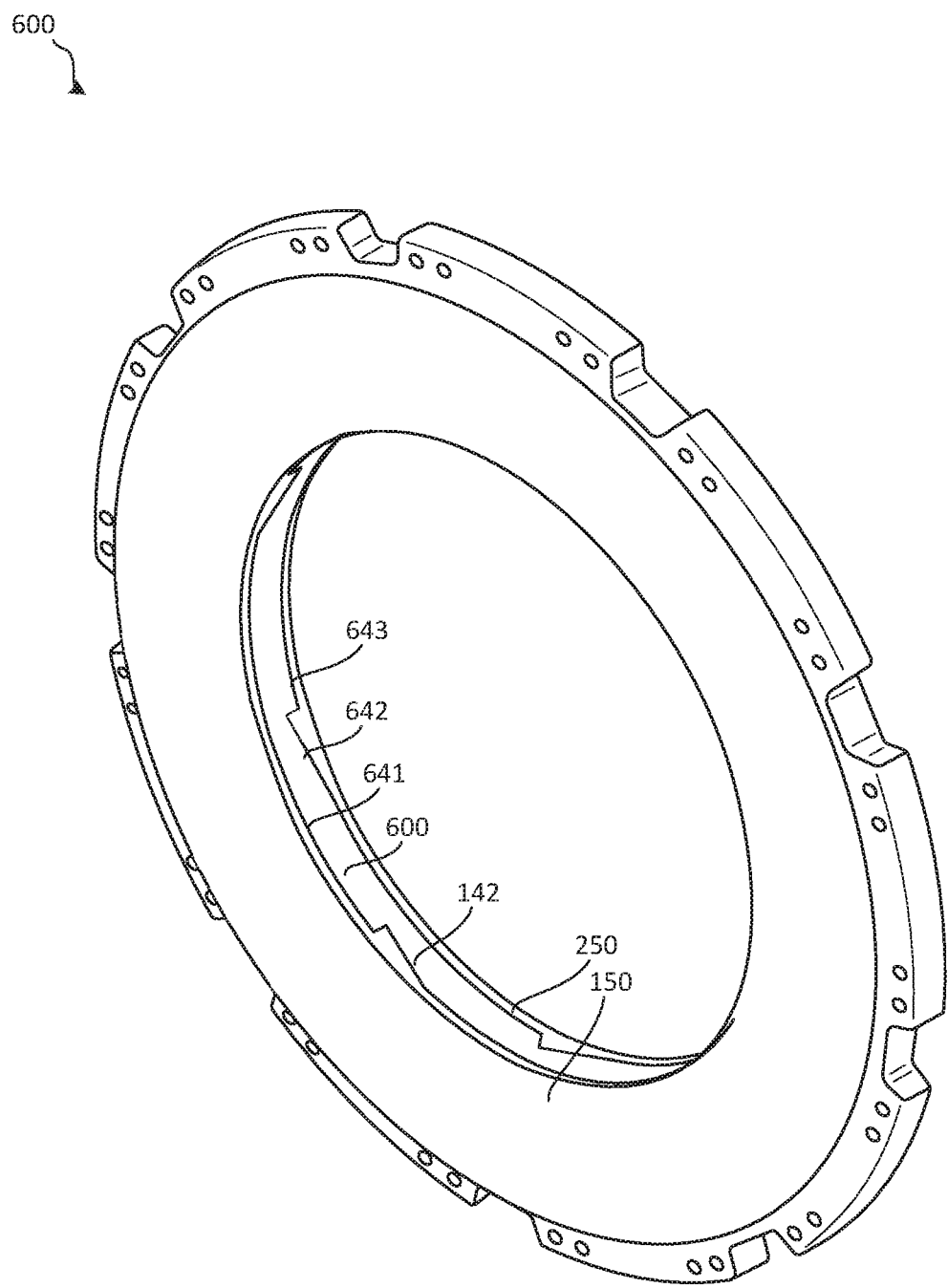
FIG. 6 illustrates a perspective view of a friction disk having wear liners disposed on opposing surfaces of the friction disk core, according to various embodiments.

Referring now to FIG. 6, a perspective view of a friction disk 600 having wear liners (150,250) disposed on opposing surfaces of the friction disk core 640, according to various embodiments. In various embodiments, friction disk core 640 may have a first side 641 and a second side 643 opposite the first side 641. The first side 641 may interface with a first wear liner 150, and the second side may interface with a second wear liner 250. The second wear liner 250 may be offset from first wear liner 150.

Figure 7:
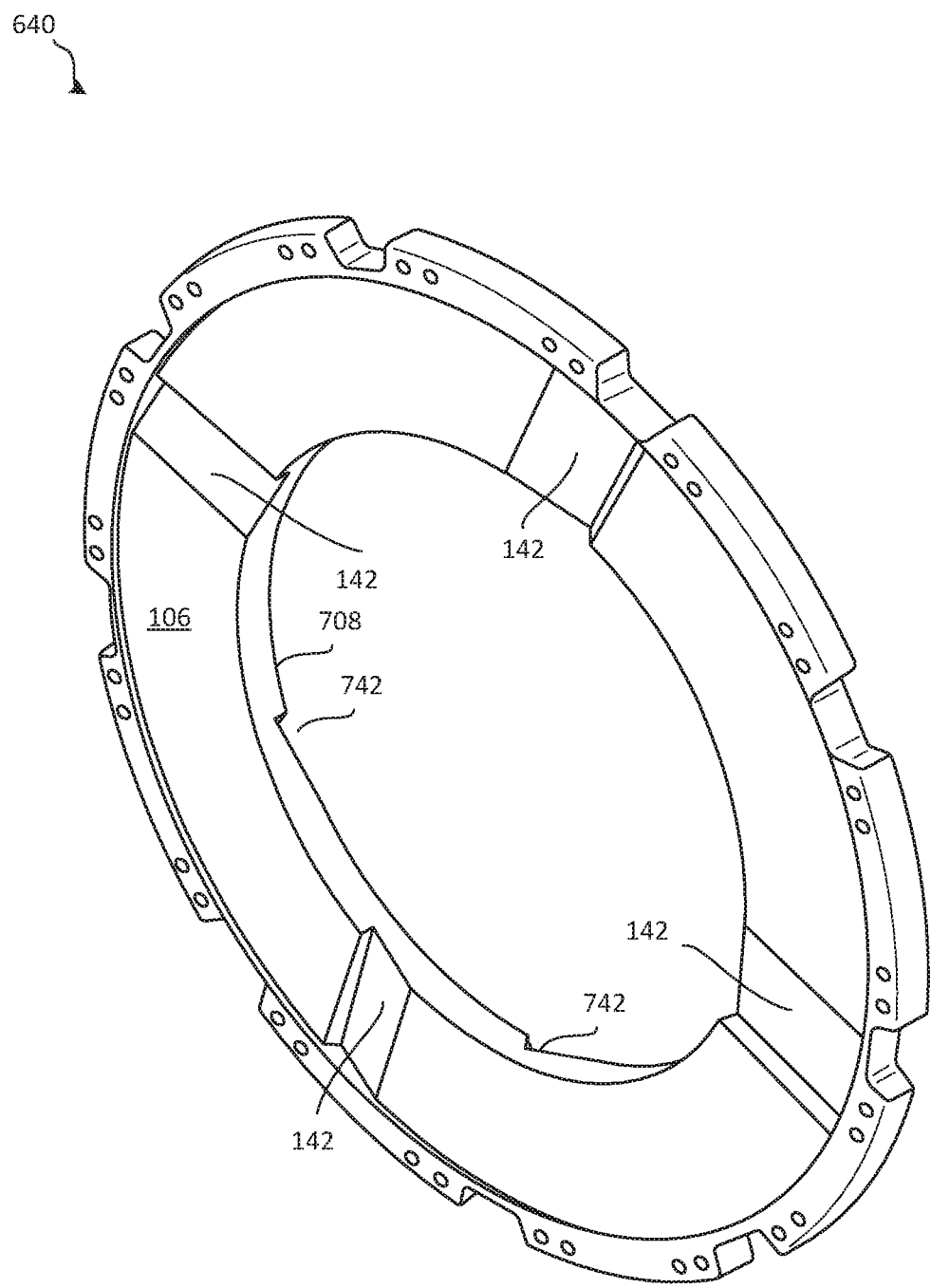
FIG. 7 illustrates a perspective view of a friction disk core define a plurality of recesses for receiving a corresponding plurality of notches of a wear liner, according to various embodiments.

FIG. 7 illustrates a perspective view of friction disk core 640 having a plurality of recesses 142 on first side 141 for receiving a corresponding plurality of notches 152 (FIG. 5) of wear liner 150, according to various embodiments. That is, a plurality of recesses 142 may be formed in, and defined by, first surface 106 of the friction disk core 640. A plurality of second recesses 742 may be formed in, and defined by, second surface 708 of the friction disk core 640. In various embodiments, the recesses 142, 742 have two legs, a gradual decline and a substantially perpendicular leg, and the recesses 142, 742 may be configured to face/engage the non-wear surface of the wear liners. In various embodiments, the recesses 142, 742 are circumferentially distributed and are configured to be aligned with corresponding/complementary notches 152 of the wear liners 150. In various embodiments, the first plurality of recesses 142 may be offset from the second plurality of recesses 742. By staggering the first plurality of recesses from the second plurality of recesses, the friction disk core 640 may be stronger by not thinning out at the recess locations. Additionally, this engagement between notches 152 and recesses 142 may facilitate torque transfer between the friction disk core 240 and the wear liners 150.

Referring back to FIG. 1, each wear liner of a given stator 48 may frictionally interface with a respective wear liner of an immediately adjacent rotor 49. The gap between immediately adjacent wear liners may be less than half of the height of the notches. This may ensure that wear liners remain connected to their respective stators 48 and rotors 49 at all times during operation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
    a friction disk core comprising:
        a core outer surface and a core inner surface; and
        a first plurality of recesses disposed on the core outer surface;
        a second plurality of recesses disposed on the core inner surface, the second plurality of recesses being offset from the first plurality of recesses;
    a first wear liner comprising:
        an annular structure having a wear surface and a non-wear surface;
        a plurality of notches disposed on the non-wear surface, each notch in the plurality of notches having a complimentary shape to a respective recess in the first plurality of recesses, wherein each notch in the plurality of notches is configured to mate with a respective recess in the first plurality of recesses; and
    a second wear liner disposed on the core inner surface, the second wear liner being offset circumferentially from the first wear liner.

2. The friction disk of claim 1, wherein the notch further comprises an incline and a peak.

3. The friction disk of claim 2, wherein the recess comprises a decline and a step.

4. The friction disk of claim 3, wherein the peak contacts the step during operation and is configured to transfer torque from the first wear liner to the friction disk core.

5. The friction disk of claim 1, wherein the wear surface is planar and continuous.

6. A multi-disk brake system comprising:
    a first friction disk comprising:
        a first friction disk core comprising:
            a first core outer surface and a first core inner surface;
            a first plurality of recesses disposed on the first core outer surface; and a second plurality of recesses disposed on the first core inner surface, the second plurality of recesses being offset from the first plurality of recesses;
a first wear liner comprising:
  a first annular structure having a first wear surface and a first non-wear surface;
  a first plurality of notches disposed on the first wear surface, each notch in the first plurality of notches having a first complimentary shape to each respective recess in the first plurality of recesses, wherein each notch in the first plurality of notches is configured to mate with each respective recess in the first plurality of recesses; and
a second wear liner comprising:
  a second annular structure having a second wear surface and a second non-wear surface;
  a second plurality of notches disposed on the second wear surface, each notch in the second plurality of notches having a second complimentary shape to each respective recess in the second plurality of recesses, wherein each notch in the second plurality of notches is configured to mate with each respective recess in the second plurality of recesses; and
a second friction disk comprising:
  a second friction disk core comprising:
    a second core outer surface; and
    a third plurality of recesses disposed on the second core outer surface;
  a third wear liner comprising:
    a third annular structure having a third wear surface and a third non-wear surface;
    a third plurality of notches disposed on the third non-wear surface, each notch in the third plurality of notches having third complimentary shape to each respective recess in the third plurality of recesses, wherein each notch in the third plurality of notches is configured to mate with each respective recess in the third plurality of recesses.

7. The multi-disk brake system of claim 6, wherein each notch from the first plurality of notches, the second plurality of notches, and the third plurality of notches further comprises an incline and a peak.

8. The multi-disk brake system of claim 7, wherein each recess from the first plurality of recesses, the second plurality of recesses, and the third plurality of recesses comprises a decline and a step.

9. The multi-disk brake system of claim 8, wherein each peak in the first plurality of notches contacts a respective step from the first plurality of recesses during operation and is configured to transfer torque from the first wear liner to the first friction disk core.

10. The multi-disk brake system of claim 6, wherein the first wear liner, the second wear liner, and the third wear liner are each a loose component in the multi-disk brake system.

11. The multi-disk brake system of claim 6, wherein the first wear surface, the second wear surface, and the third wear surface are each planar and continuous.

* * * * *